United States Patent [19]

Seino

[11] 4,043,711
[45] Aug. 23, 1977

[54] LUBRICATING OIL PUMP
[75] Inventor: Tadashi Seino, Chigasaki, Japan
[73] Assignee: Mikuni Kogyo Kabushiki Kaisha, Tokyo, Japan
[21] Appl. No.: 571,400
[22] Filed: Apr. 24, 1975
[51] Int. Cl.² .............................................. F04B 19/02
[52] U.S. Cl. ...................................... 417/469; 92/13.8; 417/491; 417/500
[58] Field of Search ............... 417/461, 469, 487, 488, 417/492, 493, 494, 498, 499, 500, 503, 467, 518, 519; 74/22 R, 22 A; 92/13.3, 13.8, 33, 65

[56] References Cited
U.S. PATENT DOCUMENTS

| 2,104,590 | 1/1938 | Hill | 417/498 |
| 2,891,718 | 6/1959 | Hall et al. | 417/488 X |
| 2,969,738 | 1/1961 | Ulbing | 417/494 X |
| 3,229,640 | 1/1966 | Williams | 417/499 |
| 3,353,492 | 11/1967 | Heinzelmann et al. | 417/461 |
| 3,461,805 | 8/1969 | Karkow | 417/487 X |
| 3,541,892 | 11/1970 | Kubinek et al. | 74/22 R X |
| 3,556,691 | 1/1971 | Buri | 417/500 |

FOREIGN PATENT DOCUMENTS 244,018 12/1925 United Kingdom ................. 417/461

Primary Examiner—William L. Freeh
Assistant Examiner—Edward Look
Attorney, Agent, or Firm—Cushman, Darby & Cushman

[57] ABSTRACT

A lubricating oil pump comprising a first plunger having the stroke controllable by a first control cam means, and a second plunger connected integrally rotatably only in the rotating direction with the first plunger in order to form a pump chamber and having the stroke controllable by a second control cam means so that the delivery may be determined by taking two kinds of external conditions into consideration.

2 Claims, 11 Drawing Figures

LUBRICATING OIL PUMP

BACKGROUND OF THE INVENTION a. Field of the Invention

The present invention relates to lubricating oil pumps, and more particularly to a plunger type lubricating oil pump made to have the delivery controllable by taking two kinds of external conditions into consideration.

b. Description of the Prior Art

Various kinds of variable delivery type lubricating oil pumps performing a pumping action with a plunger reciprocated in the thrust direction with the rotation have been suggested and practiced today. However, in any of them, only one of such factors of controlling the delivery as the ambient temperature, atmospheric pressure, load applied to the engine and number of revolutions of the engine has been able to be introduced. Therefore, in case two or more of the above mentioned factors are simultaneously introduced by utilizing a conventional pump, as many pumps as the controlling factors to be introduced will have to be used simultaneously, much to the disadvantage in respect of the cost and space.

SUMMARY OF THE INVENTION

Therefore, a primary object of the present invention is to provide a plunger type lubricating oil pump made to be able to determine the delivery by simultaneously introducing two kinds of controlling factors with one unit.

Another object of the present invention is to provide a small lubricating oil pump which is easy to maintain.

Still another object of the present invention is to provide a plunger type lubricating oil pump wherein the control cam means to determine the delivery is easy to design.

These and other objects of the present invention will more apparent during the course of the following detailed description and appended claims.

DESCRIPTION OF THE PREFERRED EMBODIMENTS

Figure 1:
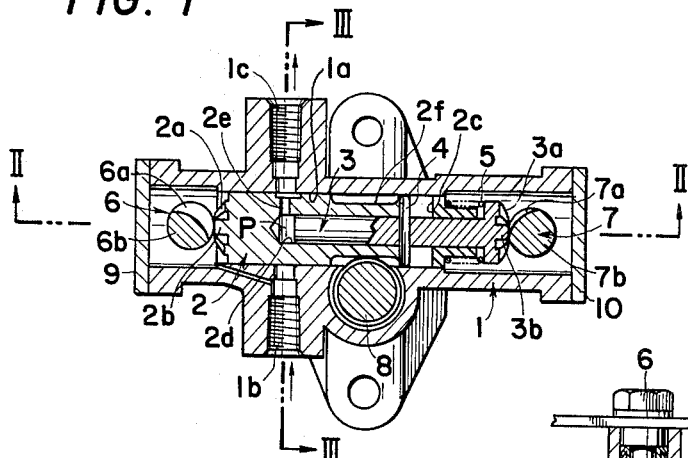
FIG. 1 is a cross-sectioned view showing an embodiment of the lubricating oil pump according to the present invention.
Figure 2:
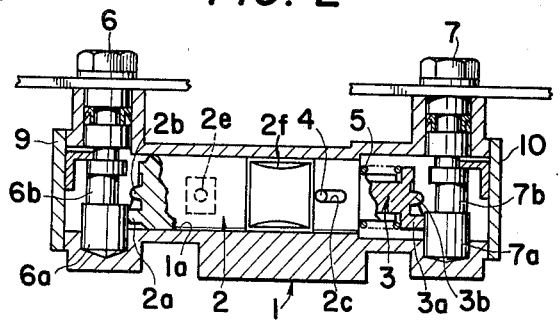
FIG. 2 is a sectioned view on line II—II in FIG. 1.

First of all, in FIGS. 1 and 2, reference numeral 1 represents a pump body having a cylinder chamber 1a, suction port 1b and delivery port 1c. Numeral 2 represents a first plunger which has a ridge-shaped cam 2a on the peripheral portion of one end surface, a projection 2b in the center portion of the end, a diametral slot 2c near the other end, a blind hole 2d opening at the above mentioned other end in the axis portion and a passage 2e capable of communicating the blind hole 2d with the suction port 1b and delivery port 1c in the bottom portion of said blind hole 2d and is fitted rotatably and slidably in the cylinder chamber 1a. Numeral 3 represents a second plunger fitted slidably in the blind hole 2d, having a ridge-shaped cam 3a on the peripheral portion of the outer end surface and a projection 3b in the center portion of the end and forming a pump chamber P between it and the first plunger 2. Numeral 4 represents a connecting pin struck diametrally into the second plunger 3 through the slot 2c so as to connect the first plunger 2 and second plunger 3 integrally rotatably in the rotating direction and relatively movably in the axial direction. Numeral 5 represents a coiled spring applied between the first plunger 2 and second plunger 3 so as to resiliently press them in the direction of separating them from each other. Numeral 6 represents a first control cam shaft supported rotatably in the pump body 1 and having a guiding column portion 6a to be in contact with the end surface cam 2a and a control cam portion 6b to regulate the stroke of the first plunger 2 by being in contact with the projection 2b. Numeral 7 represents a second control cam shaft supported rotatably in the pump body 1 and having a guiding column portion 7a to be in contact with the end surface cam 3a and a control cam portion 7b to regulate the stroke of the second plunger 3 by being in contact with the projection 3b. Numeral 8 represents a worm supported rotatably in the pump body 1 and meshed with a worm gear 2f made on the peripheral surface of the first plunger 2 so as to transmit a rotating power to the first plunger 2 and permit the first plunger 2 to move in its thrust direction. Numerals 9 and 10 represent lids for sealing the openings at both ends of the cylinder chamber 1a.

Figure 4:
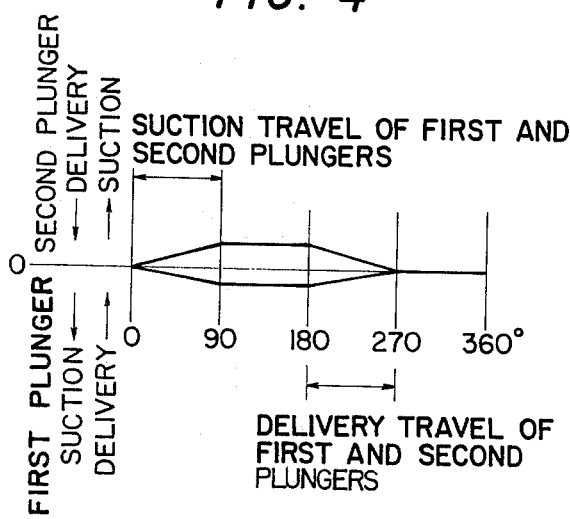
FIG. 4 is an explanatory diagram showing the variations of the suction and delivery conditions with the angles of rotation of the plunger of the pump shown in FIG. 1.
Figure 5:
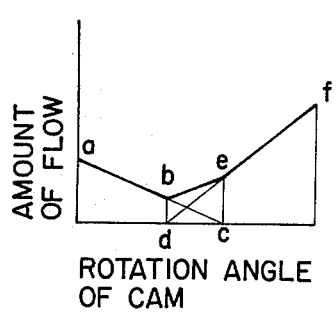
FIG. 5 is an explanatory diagram showing the variations of the lubricating oil flow with the angles of rotation of the control cam of the pump shown in FIG. 1.

FIGS. 1 and 2 show the delivery stroke as completed. When the first plunger 2 is rotated through the worm 8 from this state, the ridge-shaped cam 2a will rotate while in contact with the right side surface of the column portion 6a, therefore, when the passage 2e begins to communicate with the suction port 1b, the top surface of the ridge-shaped cam 2a will separate from the side surface of the column portion 6a, the first plunger 2 will advance leftward due to the spring 5 and, by this motion, for example, a lubricating oil will be sucked into the pump chamber P through the suction port 1b. On the other hand, the second plunger 3 will be also rotated in the same direction by the rotation of the first plunger 2, therefore, the second plunger 3 will advance rightward as synchronized with the first plunger 2 and, by this motion, too, the lubricating oil will be sucked into the pump chamber P through the suction port 1b. Thus, the lubricating oil in amounts corresponding to the respective strokes of the first and second plungers 2 and 3 will be sucked into the pump chamber P through the suction port 1b. In such case, the maximum strokes of the first and second plungers 2 and 3 will be the heights of the ridge-shaped cams 2a and 3a but will be regulated by the positions in which the projections 2b and 3b come into contact with the control cam portions 6b and 7b, respectively. Therefore, if the cam shafts 6 and 7 are made rotatably in response to such controlling factors to be considered as, for example, the temperature, atmospheric pressure, load for the engine and number of revolutions of the engine, the suction will be determined in response to the two kinds of introduced factors. The above has been an explanation on the suction travel. When this suction travel ends, the first and second plungers 2 and 3 will have been rotated by just 180°. Therefore, the delivery travel will be carried out by the latter half rotation by 180°. That is to say, when this latter half rotation begins, in the order reverse to that in the case explained on the suction travel, the first and second plungers 2 and 3 will advance respectively rightward and leftward while compressing the coiled spring 5, will deliver the lubricating oil through the delivery port 1c from the pump chamber P and will return to the state in FIG. 1 to complete one cycle of the suction and delivery. The conditions of the suction and delivery corresponding to any rotating positions of the control cam portions 6b and 7b by the first and second plungers 2 and 3 in these suction and delivery travels are as shown in FIG. 4. The conditions of the variations with the angles of rotation of the control cam portions 6b and 7b of the lubricating oil flow delivered through the delivery port 1c are exemplified as shown by $a - b - e - f$ in FIG. 5. In this case, $a - c$ represents delivered flows, for example, by the first plunger 2 and $d - f$ represents delivered flows by the second plunger 3.

Figure 3:
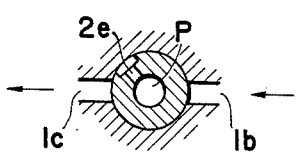
FIG. 3 is a fragmentary sectioned view on line III—III in FIG. 1.
Figure 6:
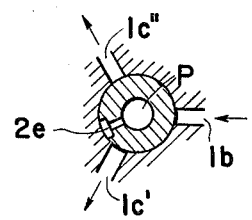
FIG. 6 is a fragmentary sectioned view corresponding to FIG. 3 of another embodiment of the present invention wherein the number and arrangement of delivery port are different from those in the pump shown in FIG. 1.
Figure 7:
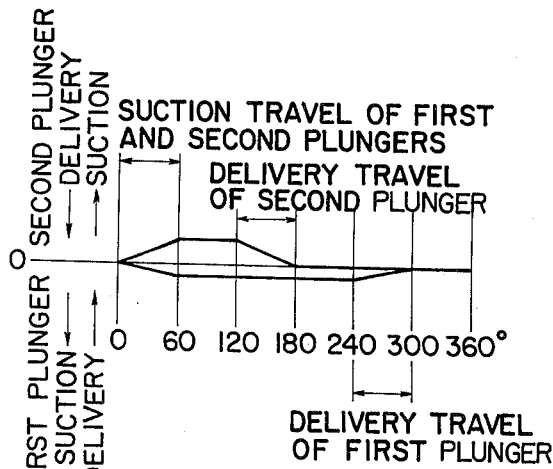
FIG. 7 is an explanatory diagram showing the variations of the suction and delivery conditions with the angles of rotation of the plunger of the pump shown in FIG. 6.
Figure 8:
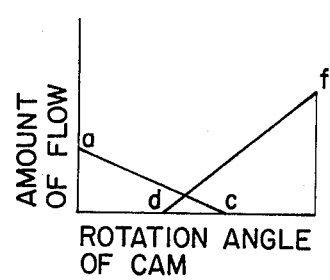
FIG. 8 is an explanatory diagram showing the variations of the lubricating oil flow with the angles of rotation of the control cam of the pump shown in FIG. 6.

The above has been described of the case that the suction port 1b and delivery port 1c are arranged in the diametral direction of the first plunger 2 as shown in FIG. 3 and the total volume regulated by the two kinds of introduced controlling factors is delivered through one delivery port. However, by properly designing the ridge-shaped cams 2a and 3a, the volumes of the lubricating oil regulated respectively by the two kinds of the introduced controlling factors can be delivered as separated from each other through two respective delivery ports 1c' and 1c" as shown in FIG. 6. The conditions of the suction and delivery corresponding to any rotating positions of the control cam portions 6b and 7b by the first and second plungers 2 and 3 in this case are shown in FIG. 7. Also the conditions of variations with the angles of rotation of the control cam portions 6b and 7b of the lubricating oil flows delivered through the respective delivery ports 1c' and 1c" are shown by $a - c$ and $d - f$ in FIG. 8. By the way, as evident from this explanation, by providing a plurality of ridge-shaped cams 2a and 3a, a plurality of suctions and deliveries can be made during one rotation of the first and second plungers 2 and 3.

Figure 9:
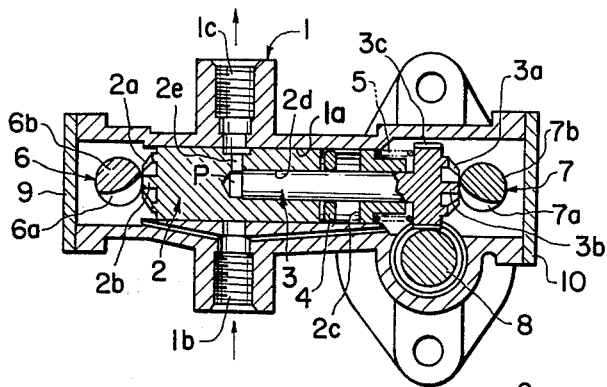
FIG. 9 is the same sectioned view as in FIG. 1 showing still another embodiment of the lubricating oil pump according to the present invention.

FIG. 9 shows an embodiment different from that in FIG. 1. This embodiment is different from that in FIG. 1 only in respect that worm teeth 3c are formed on the second plunger 3 and are meshed with the worm 8 so that a rotating power from outside may be transmitted to the second plunger 3. Therefore, the corresponding portions shall be only represented respectively by the same reference and the explanation shall be omitted.

Figure 10:
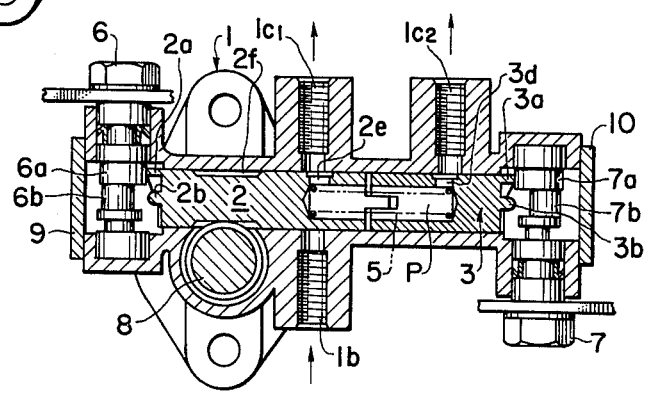
FIG. 10 is the same sectioned view as in FIG. 2 showing another embodiment of the lubricating oil pump according to the present invention.

FIG. 10 shows still another embodiment. This embodiment is different from that shown in FIG. 1 in respect that a part of the pump chamber P is formed of the first plunger 2, the other part is formed of the second plunger 3, passages 2e and 3d are formed respectively in the first and second plungers 2 and 3 so as to simultaneously communicate respectively with a first delivery port $1c_1$ and second delivery port $1c_2$, the coiled spring S is contained in the pump chamber P and the first and second plungers 2 and 3 are connected with each other through a key and key way but its operation is the same as of the embodiment in FIG. 1 except the delivery through two ports. Therefore, the same reference numerals shall be only attached respectively to the corresponding portions and the explanation shall be omitted.

In each of the above mentioned embodiments, the guiding column portions 6a and 7a and control cam portions 6b and 7b are formed so as to be respectively coaxial with each other. However, as shown in FIG. 11, they may be arranged to the body 1 as respectively different axial separate portions.

Figure 11:
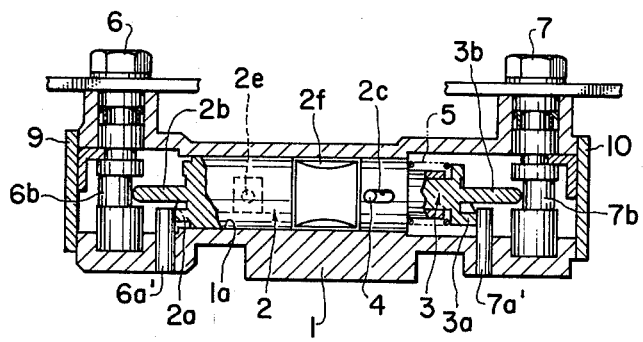
FIG. 11 is the same sectioned view as in FIG. 2 showing still another embodiment of the lubricating oil pump according to the present invention.

That is to say, in the embodiment shown in FIG. 11, instead of the guiding column portions 6a and 7a shown in FIGS. 1, 2 and 9, guide pins 6a' and 7a' are secured to the pump body 1 so that the reciprocation of the first and second plungers 2 and 3 may be obtained and the first and second control cam shafts 6 and 7 may serve only to regulate respectively the strokes of the first and second plungers 2 and 3.

I claim:

1. A lubricating oil pump comprising: a pump body having a cylinder chamber, suction port and at least one delivery port; a pair of plungers fitted rotatably and slidably in said cylinder chamber, having ridge-shaped cams formed along peripheral edge of respective outer end surfaces and connected with each other so as to be integrally rotatable in a rotating direction but relatively movable in a thrust direction; a pair of guiding column members positioned perpendicular to said pair of plungers and engaged respectively with said cams so that, when said pair of plungers are rotated, they may be respectively reciprocated in the thrust direction; a spring applied between said pair of plungers in order to bias them to be separated from each other; and a pump chamber defined by said pair of plungers therebetween and communicatable with said suction port and delivery port, a pumping action being carried out when either of said pair of plungers is driven.

2. A lubricating oil pump according to claim 1, in which said pump further comprises projections formed respectively on said outer end surfaces of said pair of plungers, and control cams formed respectively integrally with said pair of guiding column members and engageable respectively with said projections, the strokes of said respective plungers being varied by rotating said respective guiding column members.

* * * * *